United States Patent
Pang et al.

(10) Patent No.: US 7,948,922 B2
(45) Date of Patent: May 24, 2011

(54) BLOCKED REDUNDANT LINK-AWARE SPANNING TREE PROTOCOL ENHANCEMENT

(75) Inventors: Tak Ming Pang, Fremont, CA (US); Seung Hyun Min, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 741 days.

(21) Appl. No.: 11/406,170

(22) Filed: Apr. 18, 2006

(65) Prior Publication Data

US 2007/0242602 A1    Oct. 18, 2007

(51) Int. Cl.
*H04L 12/28* (2006.01)

(52) U.S. Cl. ....................................................... 370/256

(58) Field of Classification Search .................. 370/216, 370/254, 400
See application file for complete search history.

(56) References Cited

U.S. PATENT DOCUMENTS

| | | | | |
|---|---|---|---|---|
| 5,959,968 A * | 9/1999 | Chin et al. | ................ | 370/216 |
| 6,163,543 A * | 12/2000 | Chin et al. | ................ | 370/400 |
| 6,219,739 B1 | 4/2001 | Dutt | | |
| 6,298,061 B1 * | 10/2001 | Chin et al. | ................ | 370/400 |
| 6,407,985 B1 * | 6/2002 | Jain | ................ | 370/256 |
| 6,512,919 B2 * | 1/2003 | Ogasawara | ................ | 455/422.1 |
| 6,578,086 B1 * | 6/2003 | Regan et al. | ................ | 709/242 |
| 6,628,624 B1 * | 9/2003 | Mahajan et al. | ................ | 370/256 |
| 6,724,734 B1 * | 4/2004 | Shabtay et al. | ................ | 370/254 |
| 6,987,740 B1 * | 1/2006 | Di Benedetto et al. | ................ | 370/256 |
| 7,076,594 B2 * | 7/2006 | Benedetto et al. | ................ | 710/316 |
| 7,177,295 B1 * | 2/2007 | Sholander et al. | ................ | 370/338 |
| 7,350,077 B2 * | 3/2008 | Meier et al. | ................ | 713/171 |
| 7,385,939 B2 * | 6/2008 | Duncan et al. | ................ | 370/256 |
| 7,412,557 B2 * | 8/2008 | Di Benedetto et al. | ................ | 710/316 |

(Continued)

FOREIGN PATENT DOCUMENTS

JP    2004340864 A    12/2004

OTHER PUBLICATIONS

PCT Notification of Transmittal of the International Search Report and the Written Opinion of the International Searching Authority, or the Declaration mailed Sep. 11, 2008, re PCT/US07/68835 filed May 14, 2007 (6 pages).

(Continued)

*Primary Examiner* — Kevin C Harper
(74) *Attorney, Agent, or Firm* — Baker Botts L.L.P.

(57) ABSTRACT

An exemplary embodiment provides for a method for use in a network device of a plurality of network devices configured to implement a link management protocol for blocking ports corresponding to redundant links between individual network devices of the plurality of network devices. The method is used for preventing delivery of selected traffic to and from a port of the network device. Preventing, at the network device, delivery of the selected traffic to the port includes determining that a port corresponding to a remote device is to be placed in a blocked state and transmitting a port blocking notification message to the remote device, wherein the port block notification message is operative to cause the remote device to stop transmitting the selected traffic to the network device on the port. Preventing, at the network device, delivery of the selected traffic from the port includes receiving a bridge protocol data unit (BPDU) and determining if the BPDU is a port block notification message. In turn, transmission of the selected traffic is stopped from the port of the network device that received the BPDU, if the BPDU is the port block notification message.

29 Claims, 11 Drawing Sheets

U.S. PATENT DOCUMENTS

| | | | | |
|---|---|---|---|---|
| 2002/0046258 | A1 | 4/2002 | Yasushi et al. | 709/218 |
| 2002/0154606 | A1* | 10/2002 | Duncan et al. | 370/256 |
| 2004/0018839 | A1* | 1/2004 | Andric et al. | 455/433 |
| 2004/0103282 | A1* | 5/2004 | Meier et al. | 713/171 |
| 2004/0221087 | A1* | 11/2004 | Benedetto et al. | 710/316 |
| 2005/0015470 | A1* | 1/2005 | de Heer et al. | 709/221 |
| 2005/0080912 | A1* | 4/2005 | Finn | 709/230 |
| 2006/0092862 | A1* | 5/2006 | Benedetto et al. | 370/256 |
| 2006/0206656 | A1* | 9/2006 | Di Benedetto et al. | 710/316 |
| 2007/0263554 | A1* | 11/2007 | Finn | 370/256 |
| 2007/0263640 | A1* | 11/2007 | Finn | 370/401 |
| 2009/0323518 | A1 | 12/2009 | Rose | |

OTHER PUBLICATIONS

Ichikawa T et al., "Wireless bridging and routing method employing a novel frame transfer protocol with shortcut," *The 57th IEEE Semi-annual Vehicular Technology Conference Proceedings*, vol. 3, 2033-2037, Apr. 2003.

Cisco: "Spanning Tree Protocol: Understanding Rapid Spanning Tree Protocol (802.1w)," Retrieved from the Internet: URL:http://www.cisco.com/en/US/tech/tk389/tk621/technologies_white_paper09186a0080094cfa.shtml (retrieved on Sep. 26, 2005), Mar. 4, 2005.

European Search Report for EP 07760430, Aug. 12, 2010.

Dinicolo, Dan, "Spanning Tree Protocol Convergence," CCNA Study Guide Chapter 03, May 28, 2006.

IEEE Computer Society, 802.1D 2004 Edition, IEEE Standard for Local and Metropolitan Area Networks. Media Access Control (MAC) Bridges, Copyright Jun. 9, 2004. IEEE.

IEEE Computer Society, 802.1Q 2003 Edition, IEEE•Standard for Local and Metropolitan Area Networks. Virtual Bridged Local Area Networks, Copyright May 7, 2003. IEEE.

Clark, Kennedy and Hamilton, Kevin, CCIE Professional Development: Cisco LAN Switching, Cisco Systems, pp. 280-283, 2006.

\* cited by examiner

| PORT | BCAST / MCAST / UCAST FLOODING FLAG | TIMESTAMP |
|---|---|---|
| PORTID1 | | |
| PORTID2 | ✓ | 19:02:03 |
| PORTID3 | ✓ | 18:59:59 |
| PORTID4 | | |
| PORTID5 | ✓ | 19:02:04 |
| PORTID6 | | |
| PORTIDn | | |

FIGURE 10

BLOCKED REDUNDANT LINK-AWARE SPANNING TREE PROTOCOL ENHANCEMENT

BACKGROUND

Spanning Tree Protocol is a link management protocol that provides path redundancy while preventing undesirable bridging loops in the network. For an Ethernet Layer-2 network to function properly, only one active path can exist between two stations. Multiple active paths between stations cause traffic to loop in the network. If a bridging loop exists in the network topology, it can cause broadcast and multicast frames to be duplicated, creating a traffic storm. When bridging loops occur, a bridge may see the same stations appearing on both of its interfaces. Additionally, switches may see the same stations appearing on different ports at different times. This condition confuses the frame forwarding logic. To provide path redundancy, Spanning Tree Protocol defines a tree that spans all devices in the Layer-2 network. Spanning-Tree Protocol forces all redundant data paths into a standby (blocked) state. If the network topology changes, or if the network Spanning Tree Protocol configuration changes, the spanning-tree algorithm reconfigures the spanning-tree topology and reestablishes the link by activating the standby path or putting active links into standby state. The IEEE 802.1D Standard, entitled "Media Access Control (MAC) Bridges," defines a Spanning Tree Protocol for use in local area networks (LANs).

Bridges in an extended LAN participating in Spanning Tree Protocol gather information on other bridges in the network through observation and forwarding of STP messages. These STP messages are so-called bridge protocol data units (BPDUs). This results in selection of a unique root bridge for the stable spanning tree network topology and the removal of redundant path in the switched network by placing redundant switch ports in a blocked state. Spanning Tree Protocol operation is transparent to end stations, which are unaware of the network topology of the LAN segment to which they are being connected. Generally speaking, the root bridge originates configuration BPDUs, which other devices process and multicast out at STP-enabled ports.

FIG. 1 is a functional block diagram 100 illustrating example physical connections (102-112) between various network devices, such as Ethernet switches, wireless access points, and/or wireless mesh nodes (114-120). At startup of an instance of STP, the network devices (114-120) begin to exchange messages with each other via the various connections (102-112) in an effort to determine a root. Generally (and unless configured otherwise), the network device with a lowest numerical MAC address is the root. After the root has been determined, redundant paths are isolated. FIG. 2 is a diagram 200 illustrating example logical connections between various network devices wherein redundant paths and associated ports of blocked network devices are also identified. Solid lines (200, 204, 206) indicate active connections between the root R and other network devices (208-212). Conversely, dashed lines (214-218) indicate a redundant, blocked link. Generally, when a redundant link is blocked, the network device will not forward packets out, and drop incoming packets received on, the port corresponding to the blocked link. The network device on the other end of the blocked link, however, is not aware that the first network device has blocked the link, and will continue to forward multicast, broadcast and flooding unicast traffic on this link. In a wired environment such as an Ethernet environment, there is generally plenty of Ethernet link and port bandwidth. As a result, having device 210 continue to transmit packets that will intentionally be dropped by device 208, and other similar situations between other devices, is not usually a concern. The spanning tree protocol can also be used in wireless mesh networks to configure a tree-based Layer-2 network. However, in wireless networks, this situation may not desirable, since the medium is shared, and less bandwidth is typically available on wireless networks. As a result, transmitting those superfluous packets will likely have a detrimental effect on bandwidth and available CPU power.

In light of the foregoing, a need in the art exists for methods, apparatuses and systems that allow for, or facilitate, preventing network devices from transmitting unnecessary packets over a redundant link to a blocked port. The foregoing examples of the related art and limitations related therewith are intended to be illustrative and not exclusive. Other limitations of the related art will become apparent to those of skill in the art upon a reading of the specification and a study of the drawings.

BRIEF DESCRIPTION OF THE DRAWINGS

Exemplary embodiments are illustrated in referenced figures of the drawings. It is intended that the embodiments and figures disclosed herein are to be considered illustrative rather than limiting.

FIG. 10 is a chart illustrating a peer link table, in accordance with an exemplary embodiment.

DETAILED DESCRIPTION

Figure 1:
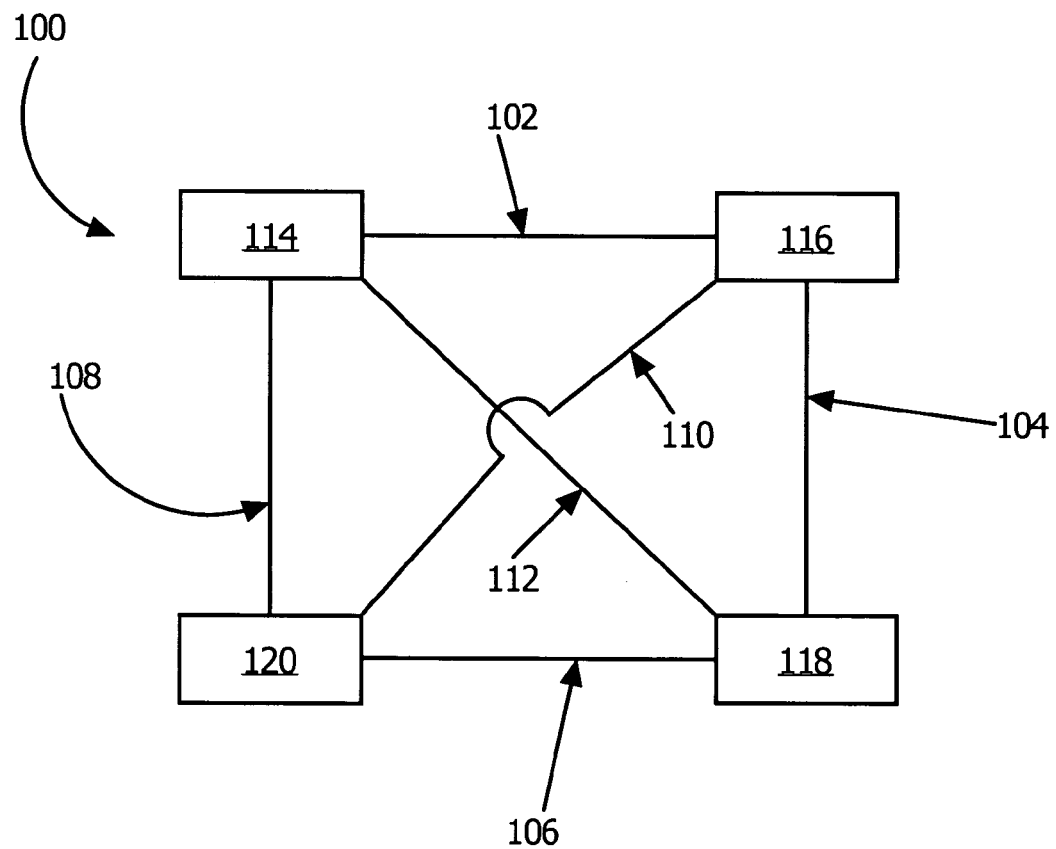
FIG. 1 is a functional block diagram illustrating example connections between various network devices.
Figure 2:
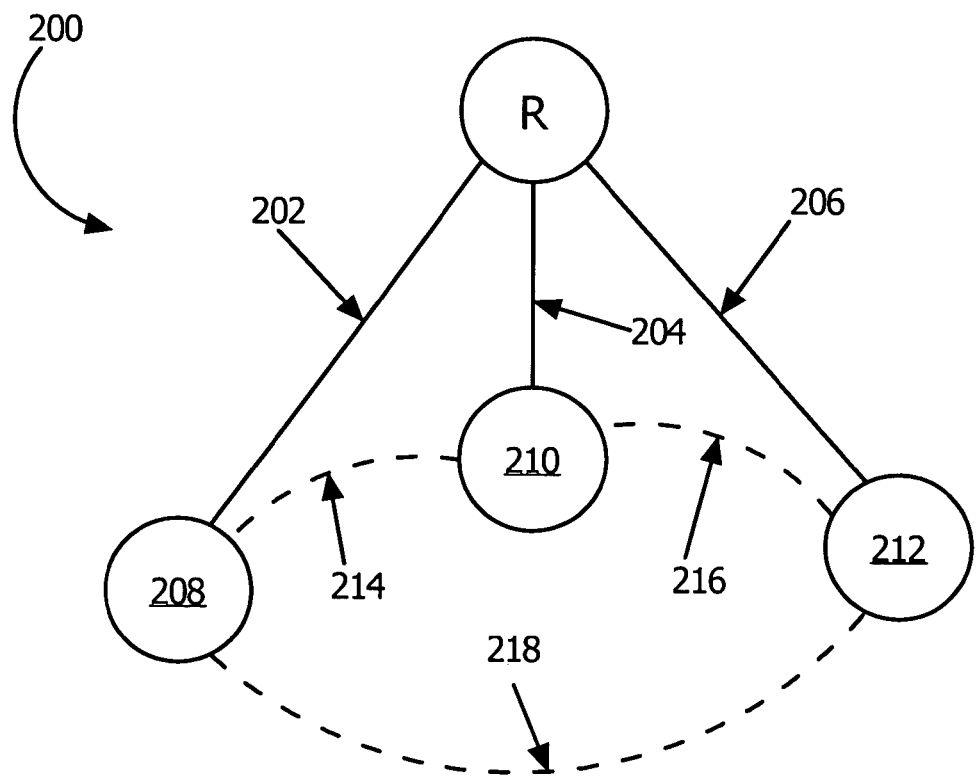
FIG. 2 is a diagram illustrating example logical connections between various network devices.

The following embodiments and aspects thereof are described and illustrated in conjunction with systems, apparatuses and methods which are meant to be exemplary and illustrative, not limiting in scope.

The claimed embodiments contemplate systems, apparatuses and methods for alerting a network device to stop forwarding network traffic to a blocked port. This is accomplished, in part, by sending a designated BPDU from a blocked port of one network device to another network device to stop sending packets. Upon receipt of this BPDU, the other network device will stop transmitting packets/frames to the blocked port except for BPDUs. To differentiate this designated BPDU from other BPDUs, it will be referred to as a port block notification message. In one implementation, the network device periodically transmits port block notification messages to the other network device to let the other network device know to continue not transmitting packets to the blocked port. In one implementation, if the transmission of the port block notification message ceases, the other network device starts to transmit packets to the port of the network device as that signifies that the port is no longer blocked.

It should be understood that the claimed embodiments are not meant to be practiced solely in conjunction with an STP protocol. The claimed embodiments can be practiced with any loop prevention protocol, multiple-path routing protocol, or protocol similar to STP wherein nodes maintain contact to exchange information but also block ports to prevent bridging or mesh routing loops. In a similar manner, the claimed embodiments can be practiced on wireless networks, wired networks and combinations thereof.

One embodiment by way of non-limiting example provides for a method for use in a network device of a plurality of network devices configured to implement a link management protocol for blocking ports corresponding to redundant links between individual network devices of the plurality of network devices. The method is used for preventing delivery of selected traffic to and from a port of the network device. Preventing, at the network device, delivery of the selected traffic to the port includes determining that a port corresponding to a remote device is to be placed in a blocked state and transmitting a port block notification message to the remote device, wherein the port block notification message is operative to cause the remote device to stop transmitting the selected traffic to the network device on the port. Preventing, at the network device, delivery of the selected traffic from the port includes receiving a bridge protocol data unit (BPDU) and determining if the BPDU is a port block notification message. In turn, transmission of the selected traffic is stopped from the port of the network device that received the BPDU, if the BPDU is the port block notification message.

One method for implementing the port block notification message is to modify existing protocols. For example, in the IEEE 802.1D STP and Cisco Per-VLAN Spanning Tree Plus Protocol (PVST+), there are two existing types of BPDUs: TCN BPDU (type 0x80) and Configuration BPDU (type 0x00). These protocols can be extended to include an additional BPDU to be the port block notification message and could perhaps be of a type 0x81. As can be seen, the port block notification message would be in the same format as the Configuration BPDU. As a result, the primary difference is the value of the type field in the message.

Figure 3:
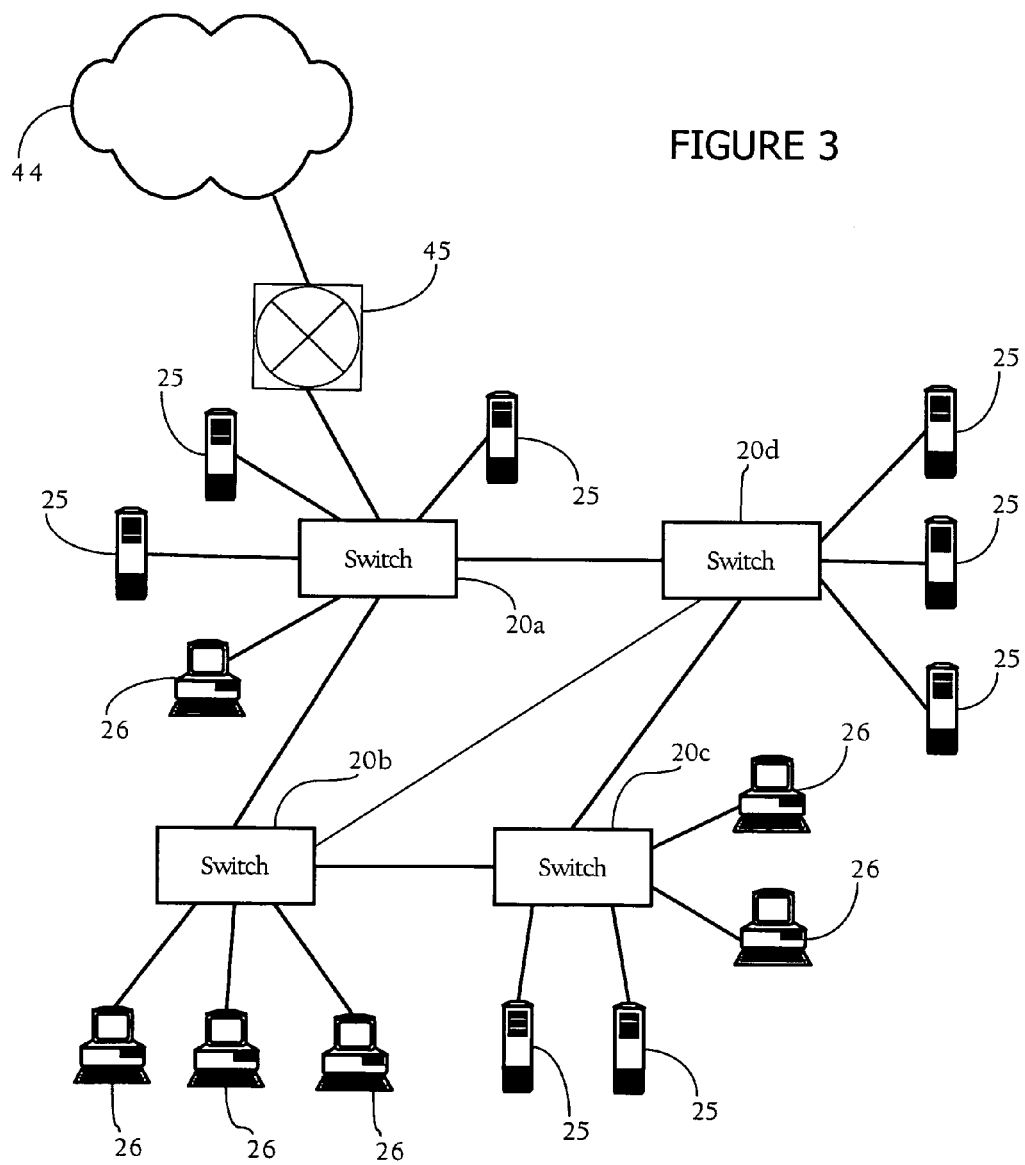
FIG. 3 is a functional block diagram illustrating a network environment in which aspects of the claimed embodiments may operate.
Figure 4:
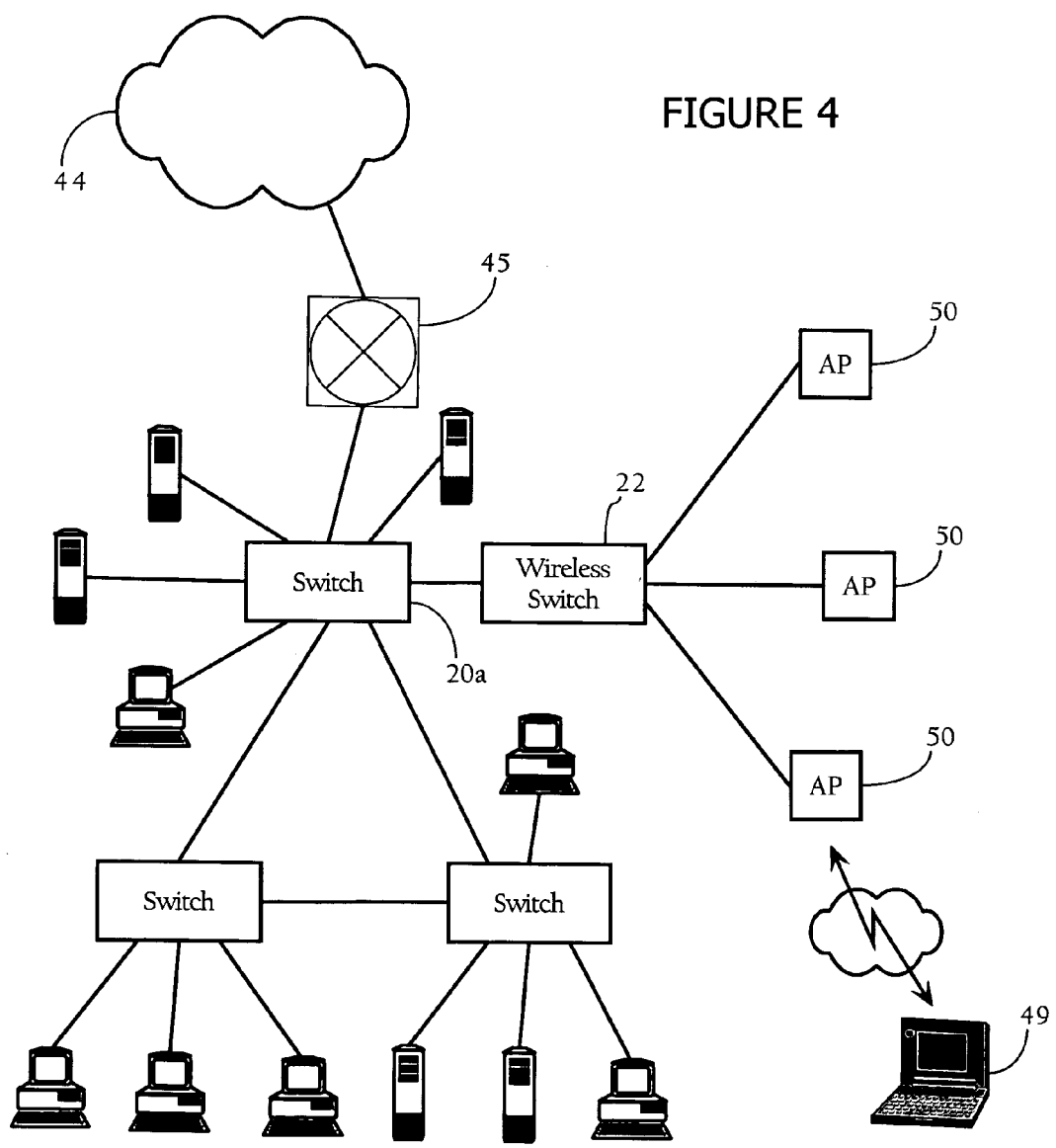
FIG. 4 is a functional block diagram illustrating a hierarchical wireless mesh network, in accordance with an exemplary embodiment.
Figure 5:
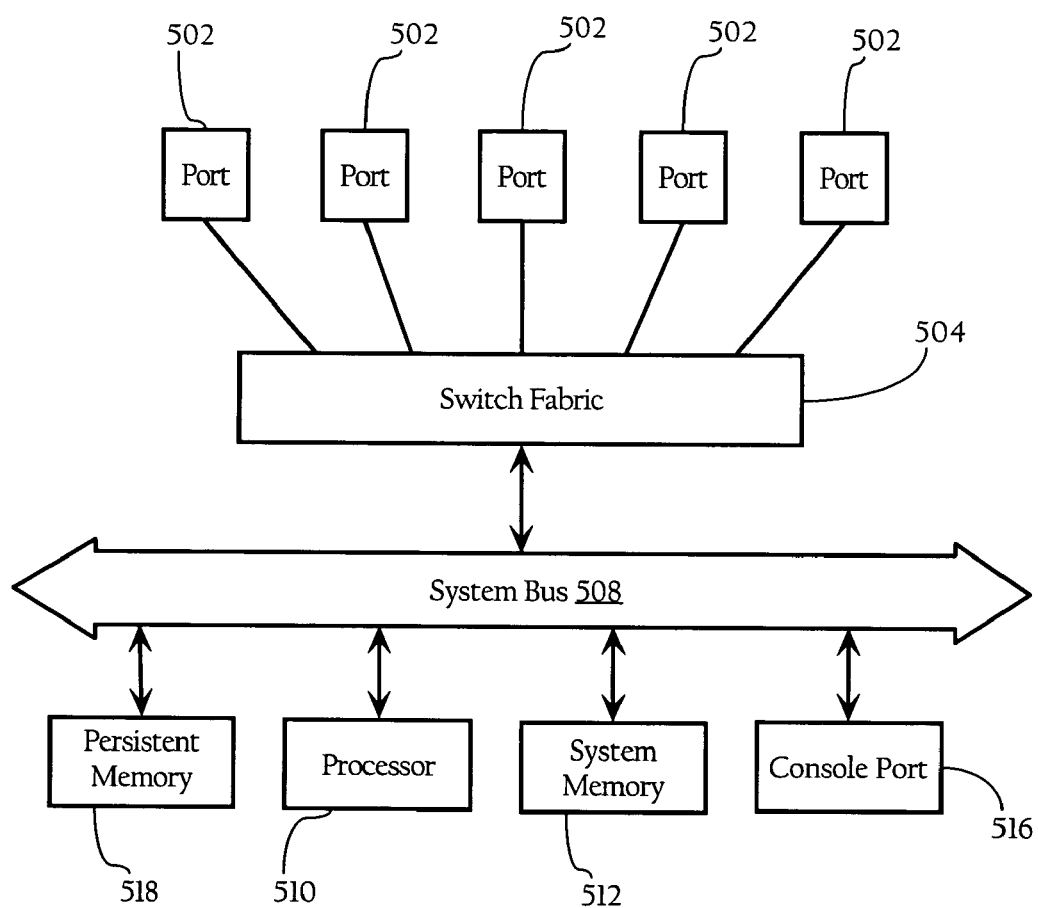
FIG. 5 is a schematic diagram illustrating the logical configuration of a wireless node, in accordance with an exemplary embodiment.

Before detailed aspects of the claimed embodiments are disclosed, FIGS. 3-5 will first discuss various network environments and a network device for which those claimed embodiments can be practiced. FIG. 3 illustrates a network environment in which aspects of the claimed embodiments may operate. In a specific embodiment of the claimed embodiments, the network environment may include switches 20a, 20b, 20c, 20d (collectively referred to as switches 20) operably connected to each other as shown. As FIG. 3 illustrates, end stations (such as servers 25 and client computers 26) are also connected to the switches 20. In one implementation, switches 20 are Ethernet switches implementing a Local Area Network (LAN) or LAN segment. Still further, router 45 and network 44, which may be a LAN, LAN segment, or a Wide Area Network (WAN), allow for the transmission of data between end stations connected to switches 20 and remote hosts reachable over network 44.

FIG. 4 illustrates another network environment in which aspects of the claimed embodiments can operate. The network illustrated in FIG. 4 is similar to the network illustrated in FIG. 3. However, the illustrated network environment includes wireless switch 22 operably connected to switch 20a and to wireless access points 50. The wireless access points 50 are enabled to wirelessly communicate with remote client devices or mobile stations 49. In one implementation, the wireless access points 50 implement the wireless network protocol specified in the IEEE 802.11 specification. The wireless access points 50 may be autonomous or so-called "fat" access points, or light-weight access points operating in connection with a wireless switch 22. The wireless access points 50 are typically connected to the network via Ethernet links; however, other link layer connection protocols or communication means can be employed. In one implementation, a wireless access point 50 comprises a processor, a memory, a network interface (e.g., an Ethernet network interface) for communication with the LAN, a wireless network interface (e.g., an IEEE 802.11 WLAN interface) for communication with one or more mobile stations, a system bus interconnecting these components, as well as software modules (including wireless mesh routing protocol, Light Weight Access Point Protocol, Spanning Tree Protocol, DHCP clients, CDP modules, SNMP functionality, etc.) and device drivers (e.g., network and WLAN interface drivers) stored in persistent memory (e.g., a hard disk drive, flash memory, etc.). At start up, these software components are loaded into memory and then accessed and executed by processor.

FIG. 5 illustrates the basic hardware components of switches 20 according to one implementation of the claimed embodiments. As FIG. 5 provides, switches 20 each comprise a processor 510, system memory 512, persistent memory 518 (e.g., flash memory or a hard disk drive), a switch fabric 504 connected to a plurality of ports 502, a system bus 508 interconnecting these components, as one more software modules (loadable into system memory 512) directed to network switching functions (e.g., switch fabric configuration, BPDU processing and the like). In one implementation, ports 502 are Ethernet interfaces. The switches 20 may optionally include a console port 516 allowing for administrative access for such purposes as configuration and diagnostics. In one implementation, switches 20 are operative to implement the spanning tree protocol defined in the IEEE 802.1D standard and the Per-VLAN Spanning Tree Plus Protocol (PVST+), described above. For example, a given switch 20 is operative to receive IEEE 802.1D and PVST+BPDUs on STP-enabled ports, process them, and multicast the BPDUs to devices connected to other STP-enabled ports of the switch 20. In addition, wireless switch 22, in one implementation, includes the same or similar hardware components illustrated in FIG. 5; however, it also includes one or more software modules directed to managing the access points 50.

Mesh Network Topology

Figure 6:
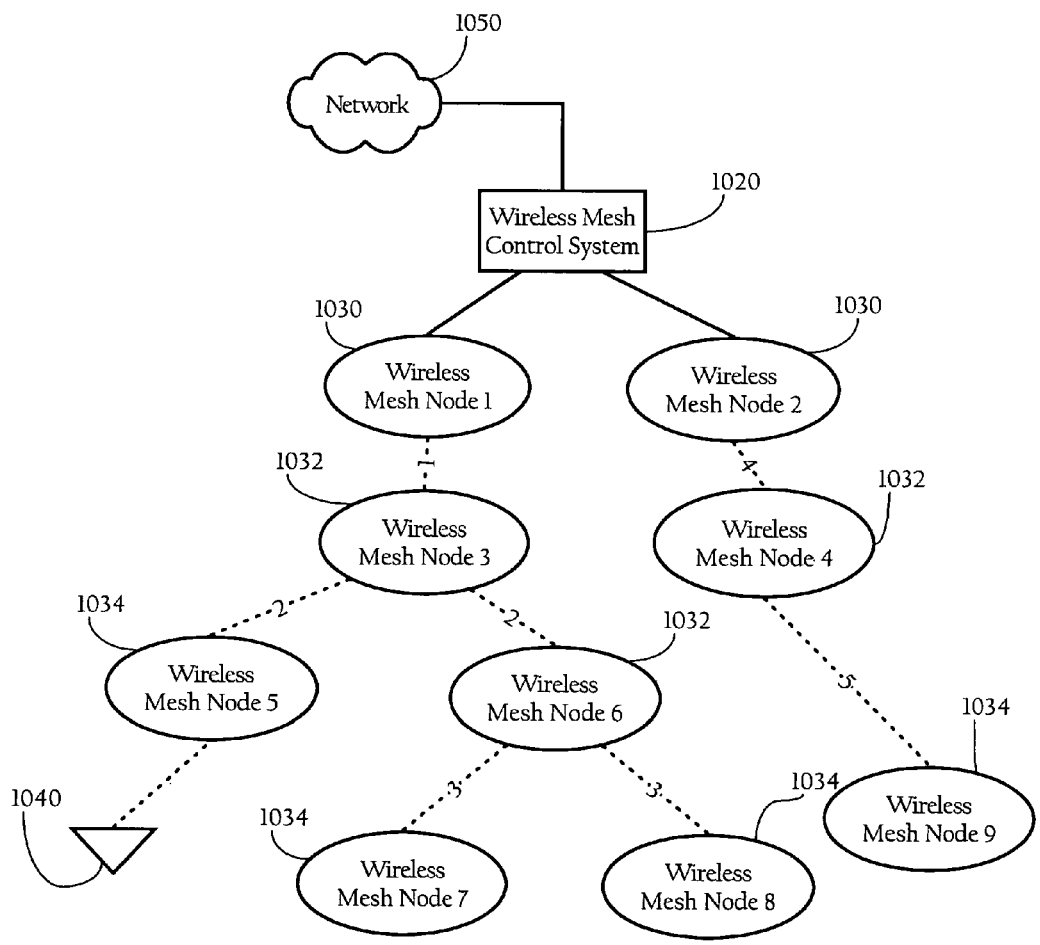
FIG. 6 is a functional block diagram illustrating another network environment in which aspects of the claimed embodiments may operate.

For didactic purposes, an embodiment is described as operating in a hierarchical wireless mesh network such as the one illustrated in FIG. 6. The claimed embodiments, however, can operate in a wide variety of hierarchical mesh network configurations. FIG. 6 illustrates a wireless mesh network according to an implementation of the claimed embodiments. In one implementation, the wireless mesh network includes a wireless mesh control system 1020, and a plurality of wireless mesh nodes. In one implementation, implementations of the claimed embodiments achieve a hierarchical architectural mesh overlay imposed on the mesh network of wireless mesh nodes to create a downstream direction towards leaf mesh nodes 1034, and an upstream direction toward the root nodes 1030. For example, in the hierarchical mesh network illustrated in FIG. 6, first hop mesh node 1 (1030) is the parent of intermediary mesh node 3 (1032). In addition, intermediate mesh node 3 (1032) is the parent to leaf mesh node 5 (1034) and intermediate mesh node 6 (1032). In one implementation, this hierarchical relationship is used in routing packets between wireless clients 1040, or between wireless clients 1040 and network 1050. In the wireless mesh network illustrated in FIG. 6, the mesh nodes are arranged in two hierarchical tree structures—one root node is mesh node 1, while the other root node is mesh node 2. Of course, a variety of hierarchical configurations are possible including a fewer or greater number of hierarchical tree structures. Still further, the hierarchical configuration may be dynamic in that the parent and child relationships between mesh nodes may change depending on factors such as topology change, node failures, and the like. As discussed in more detail below, implementations of the claimed embodiments allow for automatic configuration of the hierarchical routing overlay. In addition, some implementations of the claimed embodiments adapt to changing conditions of the hierarchical mesh network, such as RF interference, node failures, and the like.

The mesh nodes in the mesh network, in one implementation, generally include one radio, operating in a first frequency band, and an associated wireless communication functionality to communicate with other mesh nodes to thereby implement the wireless backbone, as discussed more fully below. All or a subset of the mesh nodes, in one implementation, also include an additional radio, operating in a second, non-interfering frequency band, and other wireless communication functionality to establish and maintain wireless connections with mobile stations, such as wireless client 1040. For example, in 802.11 wireless networks, the backbone radios on the wireless nodes may transmit wireless packets between each other using the 802.11a protocol on the 5 GHz band, while the second radio on each wireless node may interact with wireless clients on the 2.4 GHz band (802.11b/g). Of course, this relation can also be reversed with backhaul traffic using the 802.11b/g frequency band, and client traffic using the 802.11a band. In other implementations, however, a single radio (and frequency band) is used to support both backbone and client traffic. In other implementations, there can be multiple backbone radios and multiple client access radios as well.

In one implementation, the backbone or backhaul radios of mesh nodes for a given tree are set to the same channel within the backhaul frequency band. Collectively, the mesh nodes, in one implementation, use the Carrier Sense Multiple Access with Collision Avoidance (CSMA/CA) disclosed in the IEEE 802.11 standard to coordinate transmissions in the wireless mesh. Other contention-based transmission mechanisms can also be used. Additionally, a variety of channel assignment schemes can be used. For example, for a given mesh node, the operating channel for upstream data transfer, in one implementation, can be different than the operating channel used for downstream data transfer. For example, wireless transmissions between mesh node 1 and mesh node 3 can occur on channel 1, while mesh node 3 communicates with mesh node 5 and mesh node 6 on channel 2. In one implementation, the upstream and downstream channels assigned to a given mesh node are non-overlapping channels, while in other implementations they are overlapping channels. In one implementation, the channel assignments between mesh nodes are statically configured. In other implementations, operating channels can be dynamically assigned. However, this channel assignment scheme is not required by the claimed embodiments. In other implementations, all mesh nodes in the mesh network operate on the same channel within the backhaul frequency band.

As discussed more fully below, each mesh node in the mesh network, in one implementation, is operative to transmit and receive packets from other mesh nodes according to a mesh routing hierarchy. Each mesh node, in one implementation, is further operative to establish and maintain wireless connections to one or more wireless client devices 1040. A mesh network control system 1020, in one implementation, is operative to monitor which mesh node that each wireless client is associated and operative to route packets destined for the wireless clients to the wireless mesh node to which the client is associated.

Mesh Node Configuration

Figure 7:
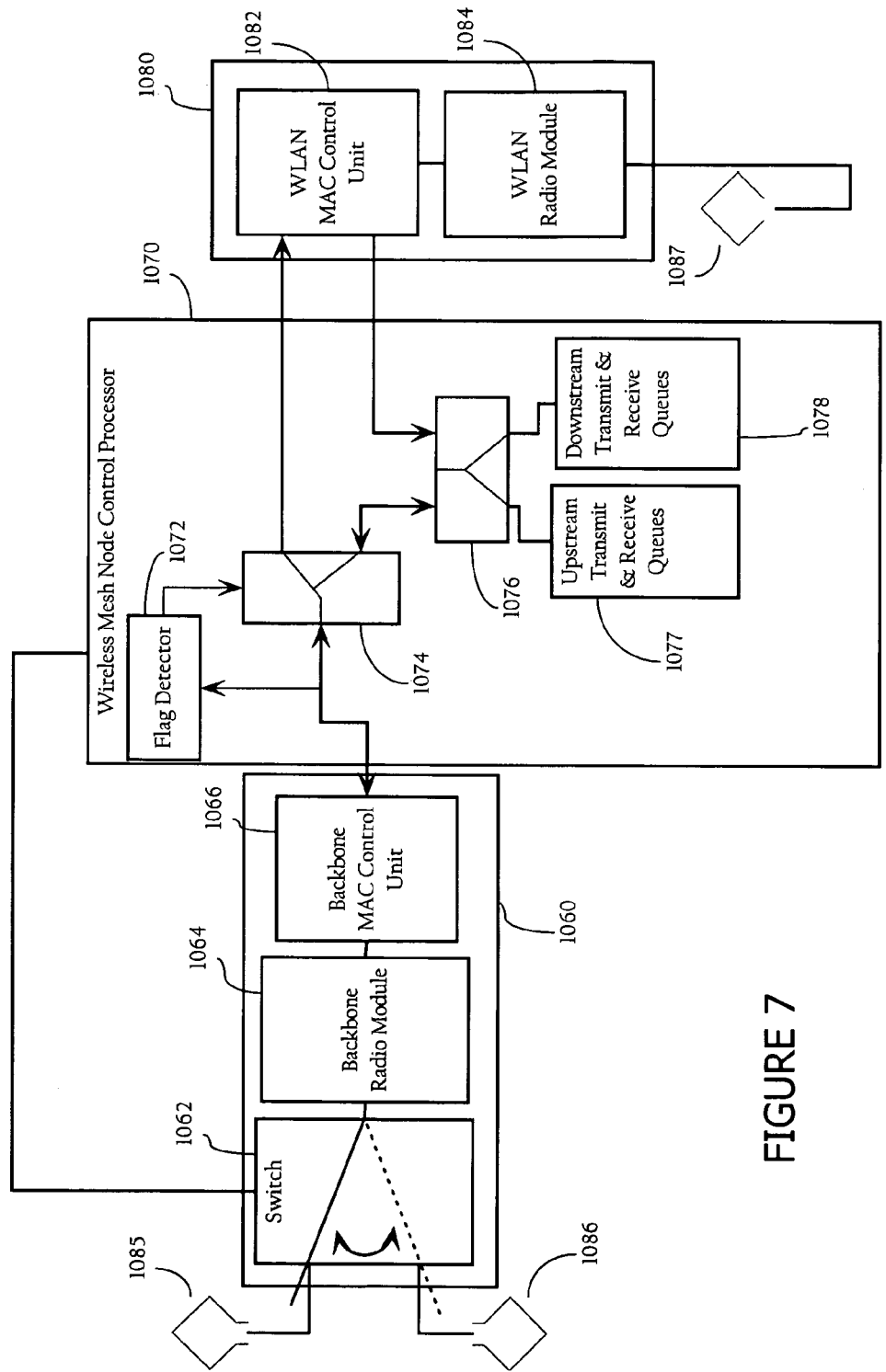
FIG. 7 is a functional block diagram showing the components of a network device, in accordance with an exemplary embodiment.

The following describes, for didactic purposes, the configuration of a mesh node according to one implementation of the claimed embodiments. Other mesh node configurations are possible. FIG. 7 is a schematic diagram illustrating the logical and/or functional components of a mesh node according to one implementation of the claimed embodiments. The mesh node illustrated in FIG. 7 includes a wireless backbone interface unit 1060 operating in a first frequency band, and a WLAN interface unit 1080 operating in a second frequency band. Specifically, as FIG. 7 illustrates, a mesh node generally comprises mesh node control processor 1070, wireless backbone interface unit 1060, and WLAN interface unit 1080. In one implementation, the mesh node control processor 1070, wireless backbone interface unit 1060, and WLAN interface unit 1080 are operably connected to each other via a system bus. Wireless back bone interface unit 1060 is operative to transfer wireless frames to upstream (parent) and downstream (child) mesh nodes under the control of mesh node control processor 1070, as discussed more fully below. WLAN interface unit 1080, in one implementation, is operative to transfer wireless frames to and from wireless clients 1040 under control of mesh node control processor 1670.

Wireless backbone interface unit 1060, in one implementation, comprises first and second antennas 1085 and 1086, switch 1062, backbone radio module 1064, and backbone MAC control unit 1066. In other implementations using a single omni-directional antenna, switch 1062 is not required. Backbone radio module 1064 includes frequency-based modulation/demodulation functionality for, in the receive direction, demodulating radio frequency signals and providing digital data streams to backbone MAC control unit 1066, and in the transmit direction, receiving digital data streams and providing frequency modulated signals corresponding to the digital data stream. In one embodiment, radio module 1064 is an Orthogonal Frequency Division Multiplexed (OFDM) modulation/demodulation unit. Of course, other modulation and multiplexing technologies can be employed, such as Frequency Hopping Spread Spectrum (FHSS) or Direct Sequence Spread Spectrum (DSSS). Backbone MAC control unit 1066 implements data link layer functionality, such as detecting individual frames in the digital data streams, error checking the frames, and the like. In one embodiment, backbone MAC control unit 1066 implements the 802.11 wireless network protocol (where 802.11, as used herein, generically refers to the IEEE 802.11 standard for wireless LANs and all its amendments). In one embodiment, the functionality described herein can be implemented in a wireless network interface chip set, such as an 802.11 network interface chip set. Of course, the claimed embodiments can be used in connection with any suitable radio-frequency-based wireless network protocol. Switch 1062 switches between first antenna 1085 and second antenna 1086 under the control of mesh node control processor 1070.

WLAN interface unit 1080 comprises WLAN MAC control unit 1082, WLAN radio module 1084, and at least one antenna 1087. Similar to backbone interface unit 1060, WLAN radio module 1084 includes frequency-based modulation/demodulation functionality for, in the receive direction, demodulating radio frequency signals and providing digital data streams to WLAN MAC control unit 1082, and in the transmit direction, receiving digital data streams and providing frequency modulated signals corresponding to the digital data stream. In one embodiment, WLAN radio module 1084 is an Orthogonal Frequency Division Multiplexed modulation-demodulation unit. In one embodiment, radio module 1084 implements the OFDM functionality in a manner compliant with the IEEE 802.11a or the 802.11g protocol, and operates in either the 5 GHz or 2.4 GHz band, respectively. WLAN radio module 1084 may also operate in a manner consistent with the 802.11b protocol employing DSSS data transmission schemes. However, as discussed above, the frequency band in which the radio module 1084 operates is configured, in one implementation, to be non-interfering relative to the backbone radio module 1064. WLAN MAC control unit 1082 implements data link layer functionality, such as detecting individual frames in the digital data streams, error checking the frames, and the like. In one embodiment, WLAN MAC control unit 1082 implements the 802.11 wireless network protocol. Other suitable wireless protocols can be used in the claimed embodiments. In one embodiment, the functionality described herein can be implemented in a wireless network interface chip set, such as an 802.11 network interface chip set. Still further, WLAN interface unit 1080, in one implementation, includes fast path and slow path transmit queues to allow high priority traffic (e.g., management frames) to have better or prioritized access to the communications medium over regular network traffic. Wireless backbone interface unit 1060 may have similar priority functionality as well.

As discussed above, wireless backbone interface unit 1060 and WLAN interface unit 1080, in one implementation, operate in different frequency bands. For example, in one embodiment, backbone radio module 1064 implements the OFDM encoding scheme in a manner compliant with the IEEE 802.11a protocol and, thus, operates in the 5 GHz band. WLAN radio module 1084 operates in the 2.4 GHz band in a manner consistent with either the 802.11b and/or 802.11 g protocol. The use of different frequency bands for wireless backbone traffic and client traffic ensures that wireless client traffic does not substantially affect or disrupt operation of the wireless backbone implemented by the mesh nodes. Of course, other schemes are possible, as the selection of frequency bands for wireless backbone traffic and wireless traffic between clients and mesh nodes is a matter of engineering choice. In other implementations, different non-overlapping channels within the same band can be used for wireless backbone traffic and client traffic. In other embodiments, each mesh node can include only a single radio for both the backhaul and client traffic. In yet other embodiments, the mesh nodes may include more than two radios.

FIG. 7 also illustrates the logical configuration of mesh node control processor 1070. Mesh node control processor 1070, in one implementation, generally refers to the hardware modules (e.g., processor, memory), software modules (e.g., drivers, etc.) and data structures (e.g., frame buffers, queues, etc.) that control mesh operation of the mesh node. In one implementation, mesh node control processor 1070 generally comprises a processor (e.g., a Central Processing Unit (CPU), etc.), a memory (e.g., RAM, EPROMS, etc.), and a system bus interconnecting the memory, the processor and the network interfaces. Mesh node control processor 1070 may further comprise an operating system and one or more software modules and/or drivers for implementing the functions described herein. Mesh node control processor 1070, as discussed above, controls the operation of wireless backbone interface unit 1060 and WLAN interface unit 1080, both of which may reside on network cards operably connected to the system bus. In one implementation, mesh node control processor 1070 is operative to control the operation of wireless backbone interface unit 1060 coordinate the transmission of frames in the upstream and downstream directions. In one implementation, the mesh node control processor 1070 may implement an upstream and downstream phase. During the downstream phase, the mesh node communicates with child mesh nodes. In the upstream phase, the mesh node communicates with the parent mesh node.

As discussed above, wireless backbone interface unit 1060, in the receive direction, provides wireless frames received at first antenna 1085 or second antenna 1086 and transmitted to mesh node control processor 1070. Flag detector 1072, in one implementation, is operative to inspect wireless frames received from other mesh nodes, and to determine whether the wireless frames should be forwarded along the wireless backbone or to a wireless client associated with the instant mesh node via WLAN interface unit 1080. In response to control signals transmitted by flag detector 1072, logical switch 1074 transmits the wireless packets along a WLAN path to WLAN interface unit 1080, or along a wireless backbone path to the upstream or downstream queues 1077 and 1078. As FIG. 7 illustrates, mesh node control processor 70 also includes logical switch 1076 that switches between upstream transmit and receive queues 1077 and downstream transmit and receive queues 1078 depending on the current operational phase or mode. For example, wireless frames received from a parent mesh node during an upstream phase are buffered in the downstream transmit/receive queues 1078 for transmission to a child mesh node for transmission during the downstream phase. Oppositely, wireless frames received from a child mesh node during the downstream phase are buffered in the parent slot queue 1077 for transmission to the parent mesh node during the upstream phase. In one implementation, mesh node control processor 1070 maintains separate transmit and receive queues for each of the parent and child mesh nodes to which the current node is associated. In the transmit direction, logical switch 1076 switches between the downstream and upstream queues depending on the transmission phase. In one implementation, both the upstream and downstream queues 1077 and 1078 may include separate queuing structures to achieve a variety of purposes. For example, mesh node control processor 1070 may be configured to include fast path and slow path queues for each of the upstream and downstream queues 1077 and 1078. Still further, the mesh node control processor 1070 can be configured to omit an upstream and downstream transmission phase, relying instead on link-layer contention-based mechanisms to coordinate transmission between parent and child mesh nodes.

As discussed above, mesh node control processor 1070 is operative to switch between first and second antennas 1085 and 1086. First antenna 1085, in one implementation, can be used for data transfer with a parent mesh node, while second antenna 1086 can be used for transfer with one or more child mesh nodes. In one embodiment, first and second antennas 1085 and 1086 are directional antennas whose peak gains are oriented depending on the location of the parent and child mesh nodes. For example, in one implementation, first antenna 1085 is generally oriented in the direction of the parent mesh node. Second antenna 1086 is oriented in the general direction of one or more child mesh nodes. In one implementation, the peak gain and beamwidth of the downstream directional antennas place an effective limit on the separation between the child mesh nodes. However, in other implementations, the child and parent mesh nodes are not associated with a particular antenna. As discussed more fully below, the antenna used to communicate with a given mesh node can be determined during a neighbor discovery and maintenance process. Antennas 1085 and 1086 can be any suitable directional antennas, such as patch antennas, yagi antennas, parabolic, and dish antennas. In one embodiment, the peak gains of the antennas are, offset from one another in a manner that maximizes coverage in all directions. In another implementation, an omni-directional antenna can be used in place of first and second antennas 1085 and 1086. Of course, a plurality of omni-directional antennas can also be used in connection with spatial antenna pattern diversity schemes to ameliorate multipath effects in indoor and outdoor systems.

Root nodes 1030 and leaf mesh nodes 1034 can include a subset of the functionality discussed above, since these mesh nodes do not have either a parent or child mesh node. For example, both root and leaf mesh nodes 1030 and 1034 can each be configured to include a single directional, or omni-directional, antenna. Other functionality can also be omitted such as switch 1062. In one implementation, however, each root or leaf mesh node can include all the essential physical functionality discussed above, and be configured to operate in a root or leaf mesh mode (as appropriate), where the downstream/upstream synchronization functionality is disabled. In that case, the leaf mesh nodes 1034, for example, operate in upstream mode waiting for their respective data slots. A configuration mechanism facilitates reconfiguration and extensions to the mesh network. For example, the wireless mesh network may be extended by simply adding additional mesh nodes in the downstream direction of a leaf mesh node and re-configuring the leaf mesh node.

Other configurations are also possible. For example, the wireless mesh node can include more than two directional antennas. For example, each backbone radio interface may be operably connected to four directional antennas, whose peak gains are each oriented at 90 degrees to each other. Still further, as discussed in more detail below, each mesh node further comprises a neighbor state machine operative to discover and maintain data relating to neighboring mesh nodes.

Figure 8:
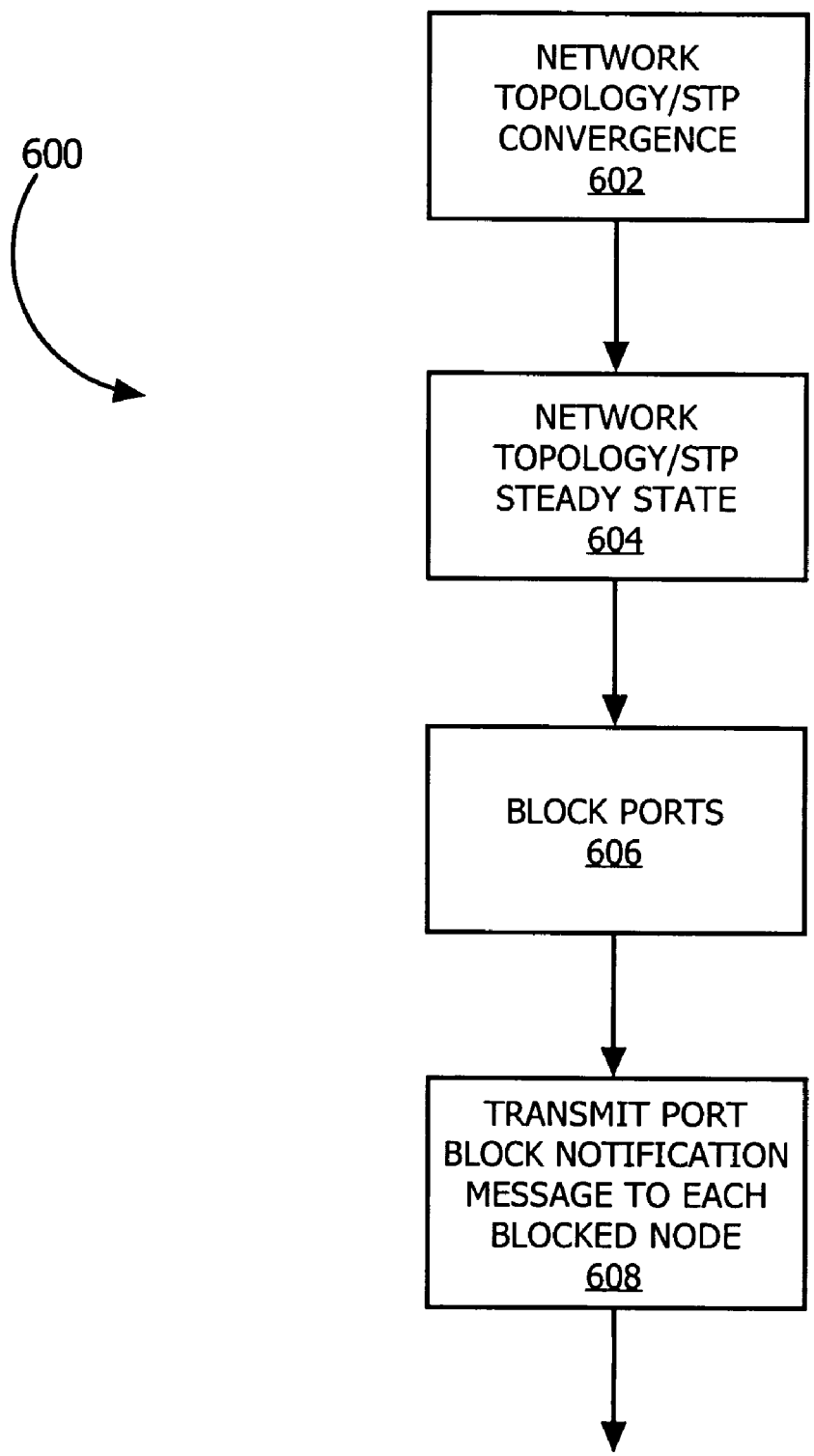
FIG. 8 is a flow chart diagram illustrating a method, in accordance with an exemplary embodiment.

FIG. 8 is a flow chart diagram illustrating a method 600, in accordance with an exemplary embodiment. Method 600 illustrates a general process flow of a network of devices, for example the networks of FIGS. 3-4 that includes devices similar to the one shown in FIG. 5 and wireless mesh nodes of FIG. 6, initiating STP and notifying certain devices to not transmit packets/frames to certain ports of other devices. Method 600 includes a network of devices starting a network topology or an STP convergence phase (602) and a steady-state phase (604)—that is, implementing routines associated with the STP protocol, for example—determining a root. Next, particular network devices block trunk ports (606) corresponding to redundant paths that have been identified. In turn, those particular devices will notify associated devices at the other end of the redundant link to stop transmitting certain packets/frames to the blocked port (608). The notification, in a preferred embodiment, is accomplished via a port block notification message which is a BPDU (or route/neighborhood announcement) specifically dedicated for this purpose.

In one implementation, once the associated devices receive the port block notification message, the associated devices will only transmit BPDUs as long as more port block notification messages are periodically sent to the associated devices. In one embodiment, the port block notification message is sent every two seconds during a period in which a port is in a blocked state. In another embodiment, the associated devices will re-start transmission of frames/packets, including BPDUs, 6 seconds after receipt of the lastly received port block notification message. And these time parameters can be sent along in the port block notification message. Of course, one skilled in the art will recognize that these time parameters can be varied depending on the desired behaviors of the system.

Figure 9:
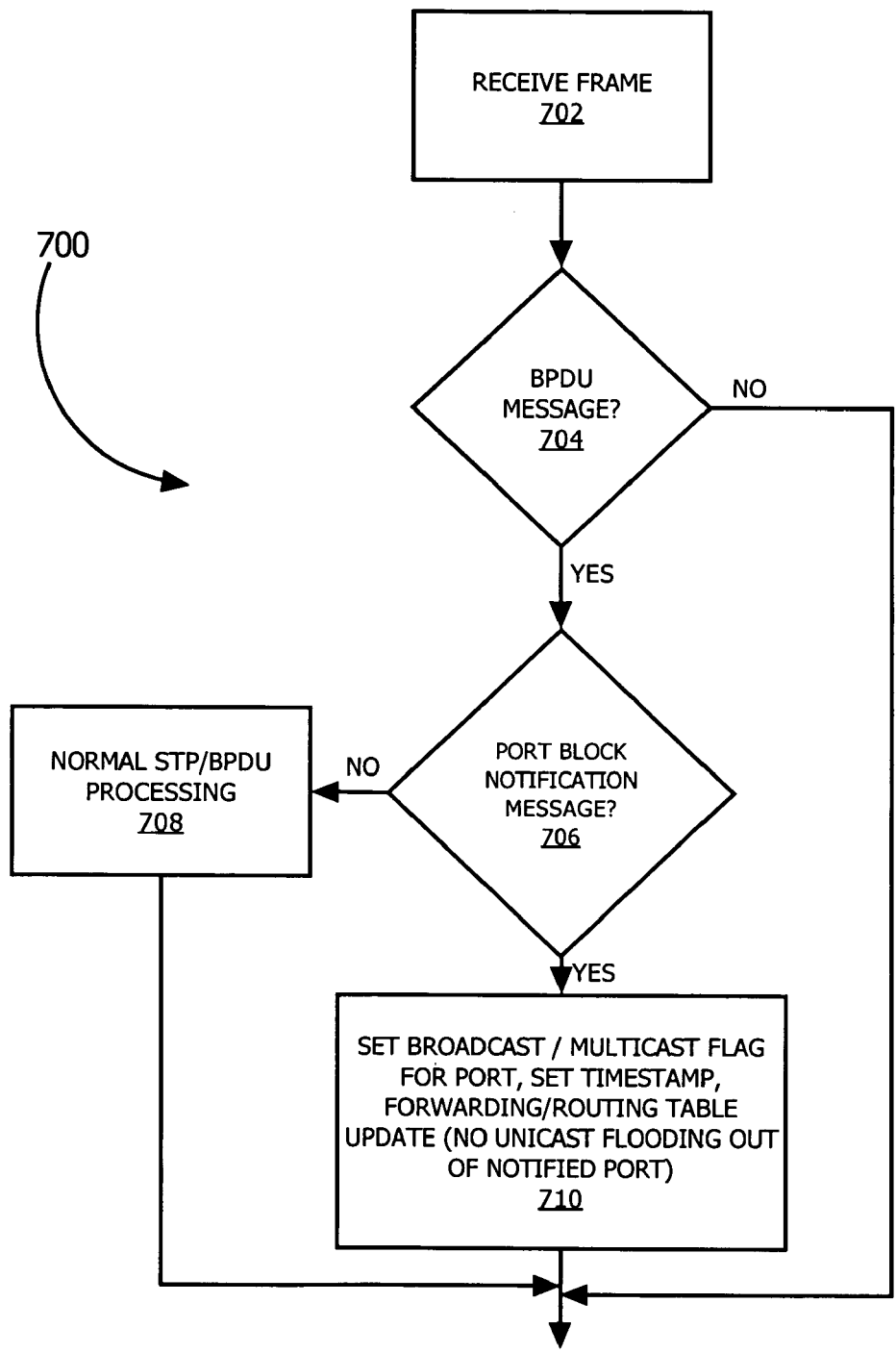
FIG. 9 is a flow chart diagram illustrating a method for processing a frame at a non-blocked network device, in accordance with an exemplary embodiment.

FIG. 9 is a flow chart diagram illustrating a method 700 for processing a frame at a non-blocked network device, in accordance with an exemplary embodiment. Similar to method 600, method 700 can also be implemented on the networks of FIG. 3-4 and on devices similar to that of FIG. 5. In summary, method 700 describes a process of a network device receiving a frame and determining if the frame is a port block notification message. As previously indicated, a port block notification message is sent from a network device that has a port in a blocked state. Method 700 includes receiving a frame (702) at a network device and the network device determines if the received frame is a BPDU message (704). If not, the device performs other processing on the frame. If the frame is a BPDU message (704), then the device determines if the BPDU is a port block notification message (706). If not, the device performs standard BPDU/STP processing (708) for that particular BPDU. In the case where the BPDU is a port block notification message (706), the device sets a broadcast/multicast/unicast-flooding flag and timestamp (710) for the port of the device where the port block notification message was received.

In one implementation, a network device can keep track of its ports that are blocked via a peer link table such as the peer link table 800 shown in FIG. 10. Table 800 includes a port identification column 802, a blocking flag column 804 and a timestamp column 806. Typically, there will be a row for each port on the network device. In some implementations, ports in the table are identified by a port identifier. These ports can be physical ports, or logical ports like VLAN interface or wireless mobility domain. In other implementations (involving wireless mesh networks for example), ports are identified relative to the MAC or other link/network address of the remote wireless node. When a port block notification message is received at a particular port of the device, a flag is set in column 804 and the timestamp is also entered in column 806. In table 800, it can be seen that ports 2, 3 and 5 of a network device have received a port block notification messages. It can be further seen that port 2 received a message at 19:02:03 (7:02 pm and 3 seconds). Of course, other time-based units can be used, such as a clock counter value. In one implementation, a separate process can scan the table and reset flags for time stamps that have expired. In another implementation, the device can check the time stamp in response to a broadcast or multicast frame and reset the flag as need. As previously indicated, port 2 will receive another port block notification message at 19:02:05 (two seconds after the previous message was received) in the event that the a device sending the messages continues to have a port in a blocked state. If the additional message is not received by 19:02:05 and others are not received by 19:02:09 (six seconds after the previous message was received), then the device will restart transmission of non-BPDU frames out of port 2. Of course, one skilled in the art will readily appreciate that various time-threshold settings could be used without departing from the scope of the claimed embodiments.

Figure 11:
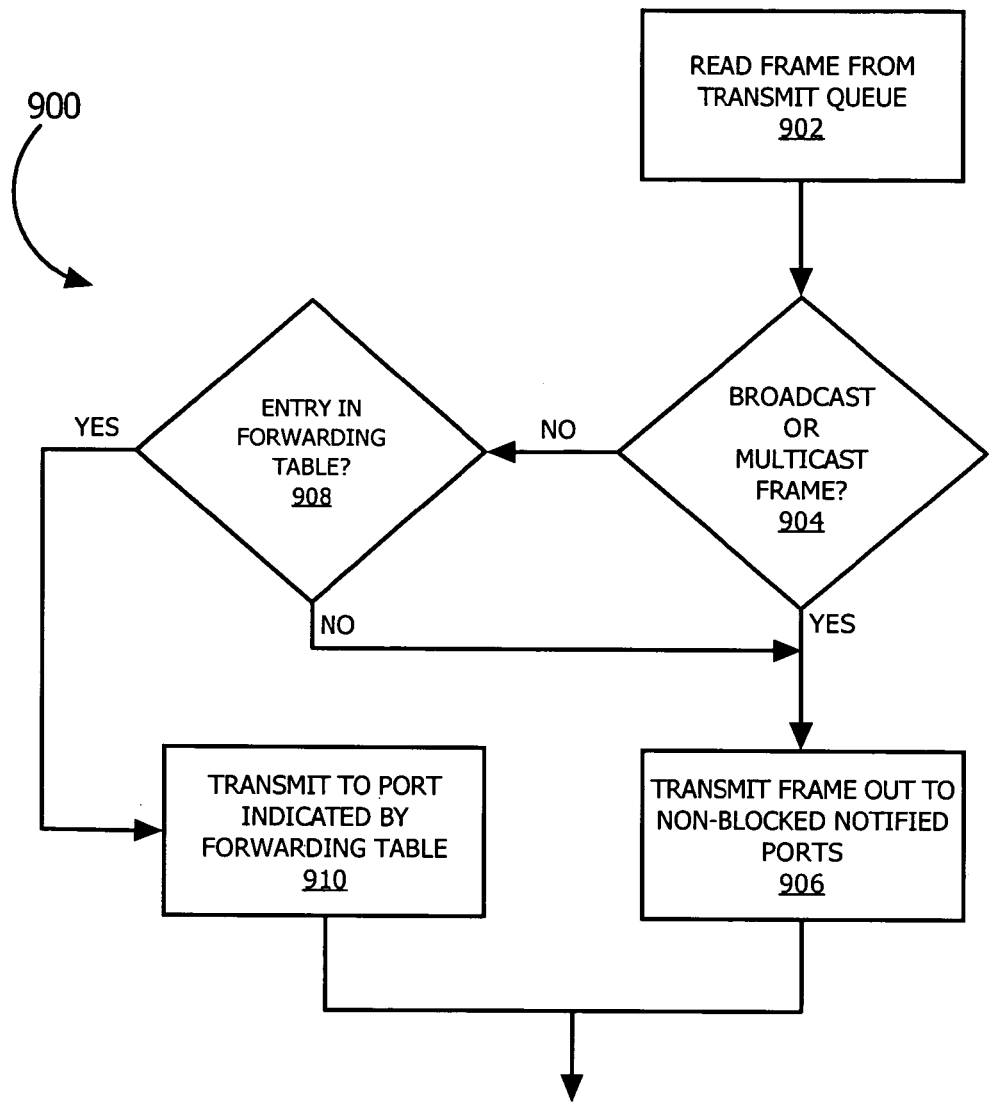
FIG. 11 is a flow chart diagram illustrating another method for processing a frame, in accordance with an exemplary embodiment.

FIG. 11 is a flow chart diagram illustrating another method 900 for processing a frame, in accordance with an exemplary embodiment. Also similar to the previously presented methods, method 900 can be implemented on the networks of FIGS. 3-4 and devices similar to that of FIG. 5. Method 900 details how a network device processes a frame before it is sent out to the destination device, according to one embodiment. In short, devices maintain one or more forwarding tables to determine to which node a given frame should be transmitted. If a frame is a unicast frame and its destination is listed in the forwarding table, then that frame is sent from the port identified in the forwarding table. The forwarding table, in one implementation, is generated by source learning.

To further illustrate method 900, the device reads a frame from a transmit queue (902) and decides the frame is multicast or broadcast (904). If yes, the multicast or broadcast frame is transmitted out to a non-blocked notified port (906). If the frame is a unicast frame, the device determines if the destination for the unicast frame is listed in the forwarding table (908). If not, the unicast frame is sent out to non-blocked notified ports (906). In the event that there is an entry (908), then the unicast frame is sent to from the port of the device as indicated in the table (910).

The claimed embodiments enjoy numerous benefits as compared to prior art systems, methods and apparatuses. For example, the claimed embodiments are particularly useful for peer-to-peer direct links between wireless nodes in a mesh network due to the amount of bandwidth that is saved which in turn results in extra CPU power. For example, in some wireless networks, multicast or broadcast traffic may cause the wireless nodes to actually send unicast frames to each wireless node in the broadcast or multicast group. Accordingly, blocking transmission reduces network traffic, freeing up the shared wireless medium for other traffic. The bandwidth saving is particularly significant if the network is broadcast and multicast intensive. Also, as previously indicated, the claimed embodiments are not limited to wireless networks. Additionally, implementation of the claimed embodiments is simple and clean as it does not affect the existing STP mechanism and associated use of BPDUs.

While a number of exemplary aspects and embodiments have been discussed above, those of skill in the art will recognize certain modifications, permutations, additions and sub-combinations thereof. For example, in a wireless mesh network, certain management messages (such as broadcast or multicast neighbor messages and route announcements) may be excepted in a manner similar to BPDUs, as discussed above. It is therefore intended that the following appended claims and claims hereafter introduced are interpreted to include all such modifications, permutations, additions and sub-combinations as are within their true spirit and scope.

What is claimed is:

1. In a network device of a plurality of network devices configured to implement a link management protocol for blocking ports corresponding to redundant links between individual network devices of the plurality of network devices, a method for preventing delivery of selected traffic to a port of the network device, the method comprising:
    executing, at the network device, a link management protocol process to identify, during a convergence phase of the link management protocol process, a port of the network device to be blocked in a steady state of the link management protocol process;
    causing the identified port of the network device to be in a blocked state during the steady state of the link management protocol process;
    determining, at the network device, that a remote port of a remote device is to be placed in a blocked state during the steady state of the link management protocol process based on the identified port of the network device to be blocked; and
    periodically transmitting, during the steady state of the link management protocol process, a port block notification message to the remote device, wherein the port block notification message is operative to cause the remote device to stop transmitting multicast, broadcast and flooding unicast traffic to the network device from the remote port to the identified port.

2. The method as recited in claim 1 further comprising periodically re-transmitting port block notification messages to the remote device as long as the port is in the blocked state.

3. The method as recited in claim 1 wherein the plurality of network devices are a plurality of wireless nodes.

4. The method as recited in claim 1 wherein the link management protocol is a spanning tree protocol.

5. The method as recited in claim 1 wherein the link management protocol is a wireless neighbor protocol.

6. The method as recited in claim 1 wherein the link management protocol is a routing protocol.

7. The method as recited in claim 1 wherein the link management protocol also isolates redundant links between the individual network devices, and wherein preventing delivery of multicast, broadcast and flooding unicast traffic from the port of the network device comprises:
    receiving a bridge protocol data unit (BPDU);
    determining if the BPDU is a port block notification message; and
    stopping transmission of multicast, broadcast and flooding unicast traffic, if the BPDU is the port block notification message, from the port of the network device that received the BPDU.

8. A network device operable to prevent delivery of selected network traffic to a port of one or more ports of the network device, the network device comprising:
    one or more ports;
    one or more processors;
    a memory;
    an application physically stored in the memory, comprising instructions operable to cause the one or more processors and the network device to:
        execute a link management protocol process to identify, during a convergence phase of the link management protocol process, a port of the one or more ports to be blocked in a steady state of the link management protocol process;
        cause the identified port to be in a blocked state during a steady state of the link management protocol process;
        determine, at the network device, that a remote port of a remote device is to be placed in a blocked state during the steady state of the link management protocol process based on the identified port of the network device to be blocked; and
        periodically transmit, during the steady state of the link management protocol process, a port block notification message to the remote device, wherein the port block notification message is operative to cause the remote device to stop transmitting multicast, broadcast and flooding unicast traffic to the network device from the remote port to the identified port of the one or more ports.

9. The network device as recited in claim 8 further comprising instructions operable to cause the one or more processors and the network device to periodically re-transmit port block notification messages to the remote device as long as the identified port of the network device is in a blocked state.

10. The network device as recited in claim 8 wherein the plurality of network devices are a plurality of wireless nodes.

11. The network device as recited in claim 8 wherein the link management protocol is a spanning tree protocol.

12. The network device as recited in claim 8 wherein the link management protocol is a wireless neighbor protocol.

13. The network device as recited in claim 8 wherein the link management protocol is a routing protocol.

14. The network device as recited in claim 8 wherein the network device is also operable to prevent delivery of the selected traffic from the port of the one or more ports of the network device, and wherein the network device further comprises instructions operable to cause the processor and the network device to:
receive, at the port of the one or more ports, a bridge protocol data unit (BPDU);
determine if the BPDU is a port block notification message; and
stop transmission of multicast, broadcast and flooding unicast traffic, if the BPDU is the port block notification message, from the port of the network device that received the BPDU.

15. A network device for preventing delivery of selected traffic to a port of the network device, comprising:
means for executing, at the network device, a link management protocol process to identify, during a convergence phase of the link management protocol process, a port of the network device to be blocked in a steady state of the link management protocol process and causing the identified port of the network device to be in a blocked state during the steady state of the link management protocol process;
means for determining, at the network device, that a remote port of a remote device is to be placed in a blocked state during the steady state of the link management protocol process based on the identified port of the network device to be blocked; and
means for periodically transmitting, during the steady state of the link management protocol process, a port block notification message to the remote device, wherein the port block notification message is operative to cause the remote device to stop transmitting multicast, broadcast and flooding unicast traffic to the network device from the remote port to the identified port.

16. The network device as recited in claim 15 wherein the network device is also operable to prevent delivery of the selected traffic from the port of the network device and the network device further comprises:
means for receiving, at the port of the network device, a bridge protocol data unit (BPDU);
means for determining if the BPDU is a port block notification message; and
means for stopping transmission of multicast, broadcast and flooding unicast traffic, if the BPDU is the port block notification message, from the port of the network device that received the BPDU.

17. In a network device of a plurality of network devices configured to implement a link management protocol for isolating redundant links between individual network devices of the plurality of network devices, a method for preventing delivery of selected traffic from a port of the network device, the method comprising:
executing, at the network device, a link management protocol process to identify, during a convergence phase of the link management protocol process, a port of the network device to be blocked in a steady state of the link management protocol process;
causing the identified port of the network device to be in a blocked state during the steady state of the link management protocol process;
periodically receiving, at a port of the network device, a bridge protocol data unit (BPDU) during the steady state of the link management protocol process;
determining if the BPDU is a port block notification message; and
stopping, during the steady state of the link management protocol process, transmission of multicast, broadcast and flooding unicast traffic, if the BPDU is the port block notification message, from the port of the network device that received the BPDU.

18. The method as recited in claim 17 further comprising resuming delivering of multicast, broadcast and flooding unicast traffic from the port that received the port block notification message, if an additional port block notification message is not received within a threshold time period.

19. The method as recited in claim 17 wherein the link management protocol is a wireless neighbor protocol.

20. The method as recited in claim 17 wherein the plurality of network devices are a plurality of wireless nodes.

21. The method as recited in claim 17 wherein the link management protocol is a spanning tree protocol.

22. The method as recited in claim 17 wherein the link management protocol is a routing protocol.

23. A network device operable to prevent delivery of selected traffic from a port of one or more ports of the network device, the network device comprising:
one or more ports;
one or more processors;
a memory;
an application physically stored in the memory, comprising instructions operable to cause the processor and the network device to:
implement a link management protocol for blocking ports corresponding to redundant links between individual network devices to identify, during a convergence phase of the link management protocol process, a port of the one or more ports to be blocked in a steady state of the link management protocol process;
cause the identified port to be in a blocked state during the steady state of the link management protocol process;
periodically receive, at a port of the one or more ports, a bridge protocol data unit (BPDU) during the steady state of the link management protocol process;
determine if the BPDU is a port block notification message; and
stop, during the steady state of the link management protocol process, transmission of multicast, broadcast and flooding unicast traffic, if the BPDU is the port block notification message, from the port of the network device that received the BPDU.

24. The network device as recited in claim 23 further comprising instructions operable to cause the processor and the network device to resume delivery of multicast, broadcast and flooding unicast traffic from the port that received the port block notification message, if an additional port block notification message is not received within a threshold time period.

25. The network device as recited in claim 23 wherein the link management protocol is a wireless neighbor protocol.

26. The network device as recited in claim 23 wherein the plurality of network devices are a plurality of wireless nodes.

27. The network device as recited in claim 23 wherein the link management protocol is a spanning tree protocol.

28. The network device as recited in claim 23 wherein the link management protocol is a routing protocol.

29. A network device for preventing delivery of selected traffic from a port of the network device, the network device comprising:

means for implementing a link management protocol for blocking ports corresponding to redundant links between individual network devices of the plurality of network devices to identify, during a convergence phase of the link management protocol process, a port of the one or more ports to be blocked in a steady state of the link management protocol process and causing the identified port to be in a blocked state during the steady state of the link management protocol process;

means for periodically receiving, at the port of the network device, a bridge protocol data unit (BPDU) during the steady state of the link management protocol process;

means for determining if the BPDU is a port block notification message; and means for stopping, during the steady state of the link management protocol process, transmission of multicast, broadcast and flooding unicast traffic, if the BPDU is the port block notification message, from the port of the network device that received the BPDU, and for resuming delivering of multicast, broadcast and flooding unicast traffic from the port that received the port block notification message, if an additional port block notification message is not received within a threshold time period.

\* \* \* \* \*